(12) United States Patent
Vasseur et al.

(10) Patent No.: US 8,830,837 B2
(45) Date of Patent: Sep. 9, 2014

(54) DYNAMIC SYNCHRONIZED SCHEDULING IN A COMPUTER NETWORK

(75) Inventors: Jean-Philippe Vasseur, Saint Martin d'Uriage (FR); Shmuel Shaffer, Palo Alto, CA (US); Charles Okwudiafor, Fremont, CA (US); Sandeep Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 12/971,440

(22) Filed: Dec. 17, 2010

(65) Prior Publication Data

US 2012/0155260 A1 Jun. 21, 2012

(51) Int. Cl.
H04L 12/26 (2006.01)
H04L 12/803 (2013.01)
H04L 12/801 (2013.01)

(52) U.S. Cl.
CPC .............. *H04L 47/125* (2013.01); *H04L 47/14* (2013.01)
USPC .......................... 370/236; 370/395.4; 370/447

(58) Field of Classification Search
USPC .......................................... 370/327
See application file for complete search history.

(56) References Cited

U.S. PATENT DOCUMENTS

| | | | |
|---|---|---|---|
| 6,504,834 B1 * | 1/2003 | Fifield .......................... | 370/345 |
| 6,587,453 B1 * | 7/2003 | Romans et al. ............... | 370/347 |
| 6,678,244 B1 | 1/2004 | Appanna et al. | |
| 6,788,689 B1 | 9/2004 | Turner et al. | |
| 6,795,506 B1 | 9/2004 | Zhang et al. | |
| 6,865,185 B1 | 3/2005 | Patel et al. | |
| 7,061,927 B2 | 6/2006 | Panigrahy et al. | |
| 7,085,227 B1 | 8/2006 | Brooks et al. | |
| 7,239,642 B1 * | 7/2007 | Chinn et al. .................. | 370/401 |
| 7,477,621 B1 * | 1/2009 | Loc et al. ...................... | 370/329 |
| 7,539,499 B2 | 5/2009 | Holur et al. | |
| 7,640,355 B1 | 12/2009 | Marshall et al. | |
| 7,693,526 B2 | 4/2010 | Qian et al. | |
| 7,711,004 B2 | 5/2010 | Xu | |
| 7,733,895 B2 | 6/2010 | Kesselman et al. | |
| 7,826,463 B2 | 11/2010 | Patel et al. | |

(Continued)

OTHER PUBLICATIONS

Thubert, "RPL Objective Function 0,", <draft-ietf-roll-of0-03>, Jul. 29, 2010 version.

(Continued)

*Primary Examiner* — Ian N Moore
*Assistant Examiner* — Eric P Smith
(74) *Attorney, Agent, or Firm* — Edwards Wildman Palmer LLP; James M. Behmke; Stephen D. LeBarron

(57) ABSTRACT

In one embodiment, a receiving node in a computer network may detect congestion, and also identifies a set (e.g., subset) of its neighbor nodes. In response to the congestion, the receiving node may assign a transmission timeslot to each neighbor node of the set based on the congestion, where each neighbor is allowed to transmit (synchronously) only during its respective timeslot. The assigned timeslots may then be transmitted to the set of neighbor nodes. In another embodiment, a transmitting node (e.g., a neighbor node of the receiving node) may receive a scheduling packet from the receiving node. Accordingly, the transmitting node may determine its assigned transmission timeslot during which the transmitting node is allowed to transmit. As such, the transmitting node may then transmit packets only during the assigned timeslot (e.g., for a given time). In this manner, congestion at the receiving node may be reduced.

17 Claims, 12 Drawing Sheets

(56) References Cited

U.S. PATENT DOCUMENTS

| | | |
|---|---|---|
| 7,830,795 B2 | 11/2010 | Zimmerman et al. |
| 7,839,864 B1 | 11/2010 | Satrawla et al. |
| 7,843,817 B2 | 11/2010 | Gong et al. |
| 2003/0126246 A1* | 7/2003 | Blouin et al. ............. 709/223 |
| 2005/0052994 A1* | 3/2005 | Lee ............................ 370/230 |
| 2006/0268908 A1* | 11/2006 | Wang et al. ............... 370/401 |
| 2008/0225737 A1 | 9/2008 | Gong et al. |
| 2009/0104914 A1* | 4/2009 | Goto et al. .............. 455/452.1 |
| 2009/0168650 A1* | 7/2009 | Kesselman ................. 370/235 |
| 2009/0203322 A1* | 8/2009 | Horn et al. ............... 455/67.13 |
| 2011/0199960 A1* | 8/2011 | Fukuzawa et al. .......... 370/327 |

OTHER PUBLICATIONS

Vasseur et al., "Routing Metrics Used for Path Calculation in Low Power and Lossy Networks," <draft-ietf-roll-routing-metrics-12>, Nov. 10, 2010 version.

Winter et al., "RPL: IPv6 Routing Protocol for Low Power and Lossy Networks," <draft-ietf-roll-rpl-15>, Nov. 11, 2010 version.

\* cited by examiner

DYNAMIC SYNCHRONIZED SCHEDULING IN A COMPUTER NETWORK

TECHNICAL FIELD

The present disclosure relates generally to computer networks, and, more particularly, to congestion in networks (e.g., shared media networks, such as wireless networks).

BACKGROUND

Synchronized shared media networks (e.g., wireless networks) transmit user traffic according to timeslots or even at fixed intervals, with an attempt to meet specific traffic requirements, optimize the overall efficiency of the system, etc. In contrast, non-synchronized systems are based on the assumption that nodes are free to transmit (after carrier sensing) when they have data to transmit without any synchronization. Although non-synchronous techniques are quite advantageous is many ways, this becomes very problematic as the offered load gets close to the maximum level of congestion that a link can tolerate before the network collapses. Current approaches generally involve increasing the bandwidth on the links close to the congestion points (e.g., at/near directed acyclic graph or "DAG" roots), such as adding links, supporting multiple frequencies, etc., or performing load balancing on the traffic across a set of links across multiple (e.g., diverse) paths, among other techniques. These alternatives are directed at reducing the risk of congestion, however there is no solution to handle the congestion once it occurs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
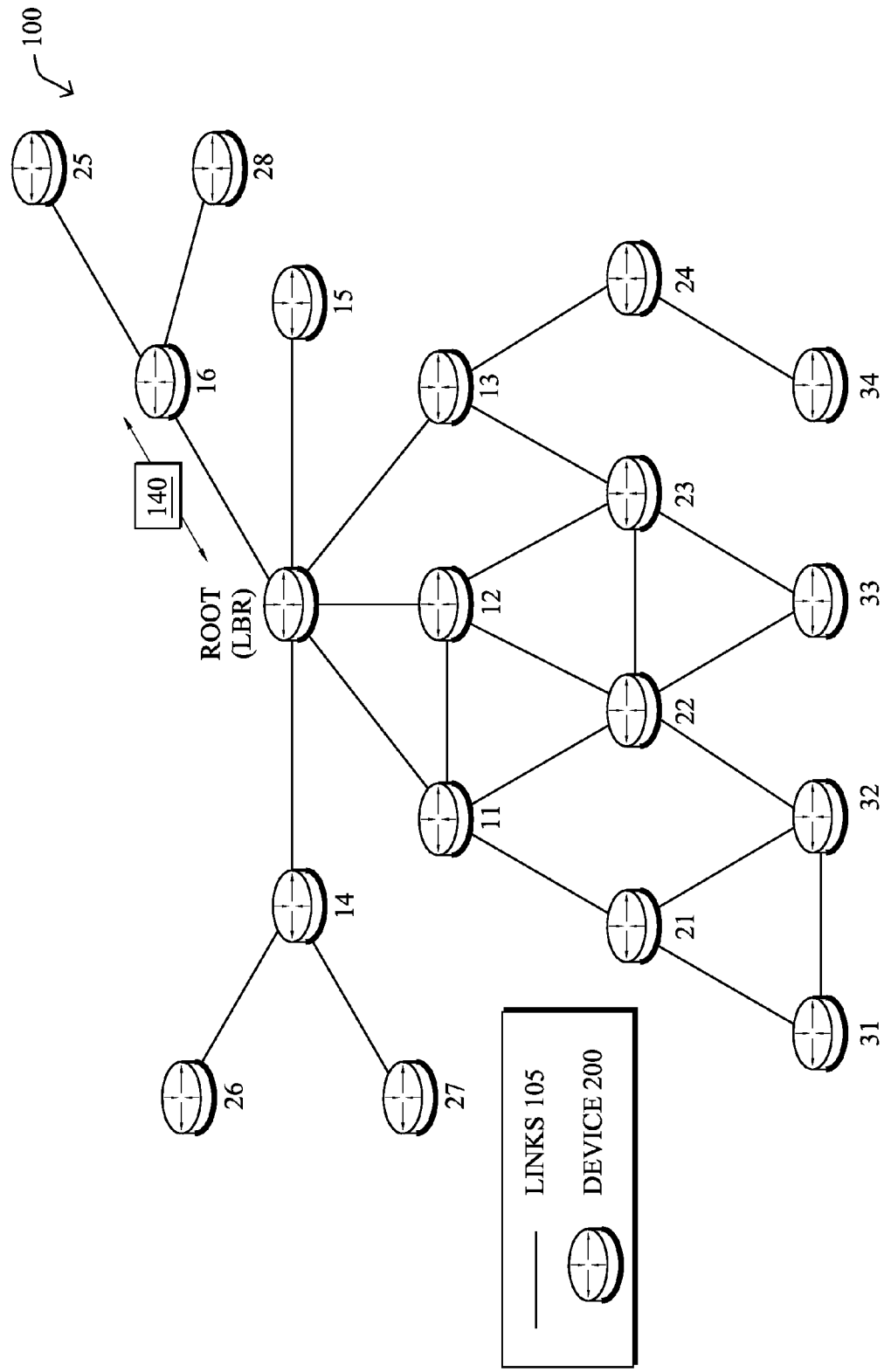
FIG. 1 illustrates an example computer network.

According to one or more embodiments of the disclosure, a receiving node in a computer network may detect congestion, and also identifies a set (e.g., subset) of its neighbor nodes. In response to the congestion, the receiving node may assign a transmission timeslot to each neighbor node of the set based on the congestion, where each neighbor is allowed to transmit (synchronously) only during its respective timeslot. The assigned timeslots may then be transmitted to the set of neighbor nodes.

According to one or more additional embodiments of the disclosure, a transmitting node (e.g., a neighbor node of the receiving node) may receive a scheduling packet from the receiving node. Accordingly (or generally at any time even without receiving a scheduling packet), the transmitting node may determine its assigned transmission timeslot during which the transmitting node is allowed to transmit. As such, the transmitting node may then transmit packets only during the assigned timeslot (e.g., for a given time). In this manner, congestion at the receiving node may be reduced.

DESCRIPTION

A network is a geographically distributed collection of nodes interconnected by communication links and segments for transporting data between end nodes, such as personal computers and workstations, or other devices, such as radios, sensors, etc. Many types of computer networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC) and others.

A wireless network, in particular, is a type of shared media network where a plurality of nodes communicate over a wireless medium, such as using radio frequency is (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example wireless network 100 (e.g., computer network, communication network, etc.) illustratively comprising nodes/devices 200 (e.g., labeled as shown, "ROOT", 11, 12, . . . 34) interconnected by links 105 (e.g., wireless communication links or other shared media links). In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices may be utilized). Also, while the embodiments are shown herein with reference to a generally wireless network, the description herein is not so limited, and may be applied to networks that have wired and wireless links.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate. In this context, a protocol consists of a set of rules defining how the nodes interact with each other.

Figure 2:
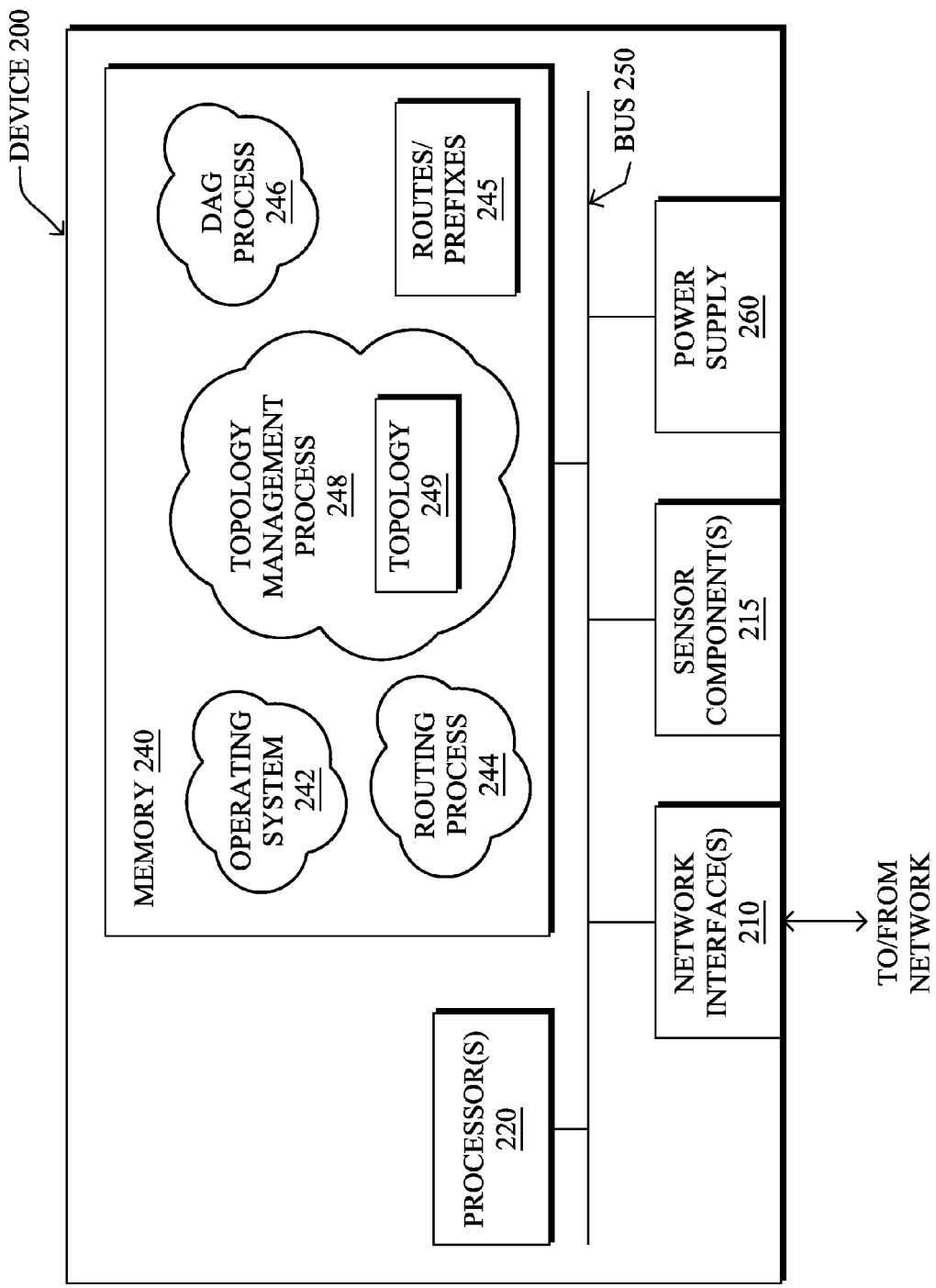
FIG. 2 illustrates an example network device/node.

FIG. 2 is a schematic block diagram of an example node/device 200 that may be used with one or more embodiments described herein, e.g., as nodes 11-34 and ROOT. The device may comprise one or more network interfaces 210 (e.g., wireless), an optional sensor component (e.g., for sensor network devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly). The network interfaces may be configured to transmit and/or receive data using a variety of different communication protocols, particularly wireless protocols as noted above and as will be understood by those skilled in the art. Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

As mentioned above, Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the to DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing is protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0"<draft-ietf-roll-of0-03> by Thubert (Jul. 29, 2010 version). These metrics may be used to identify indicia of congestion. For example, a threshold degree of utilization may be used to identify indicia of congestion. Other indicia of congestion may include monitored buffer events (e.g., a buffer collision or hit internal to a node), a number of retransmits, a number of collision.

Building a DAG may utilize a discovery mechanism to build a logical representation of the network, and route dissemination to establish state within the is network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a is next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
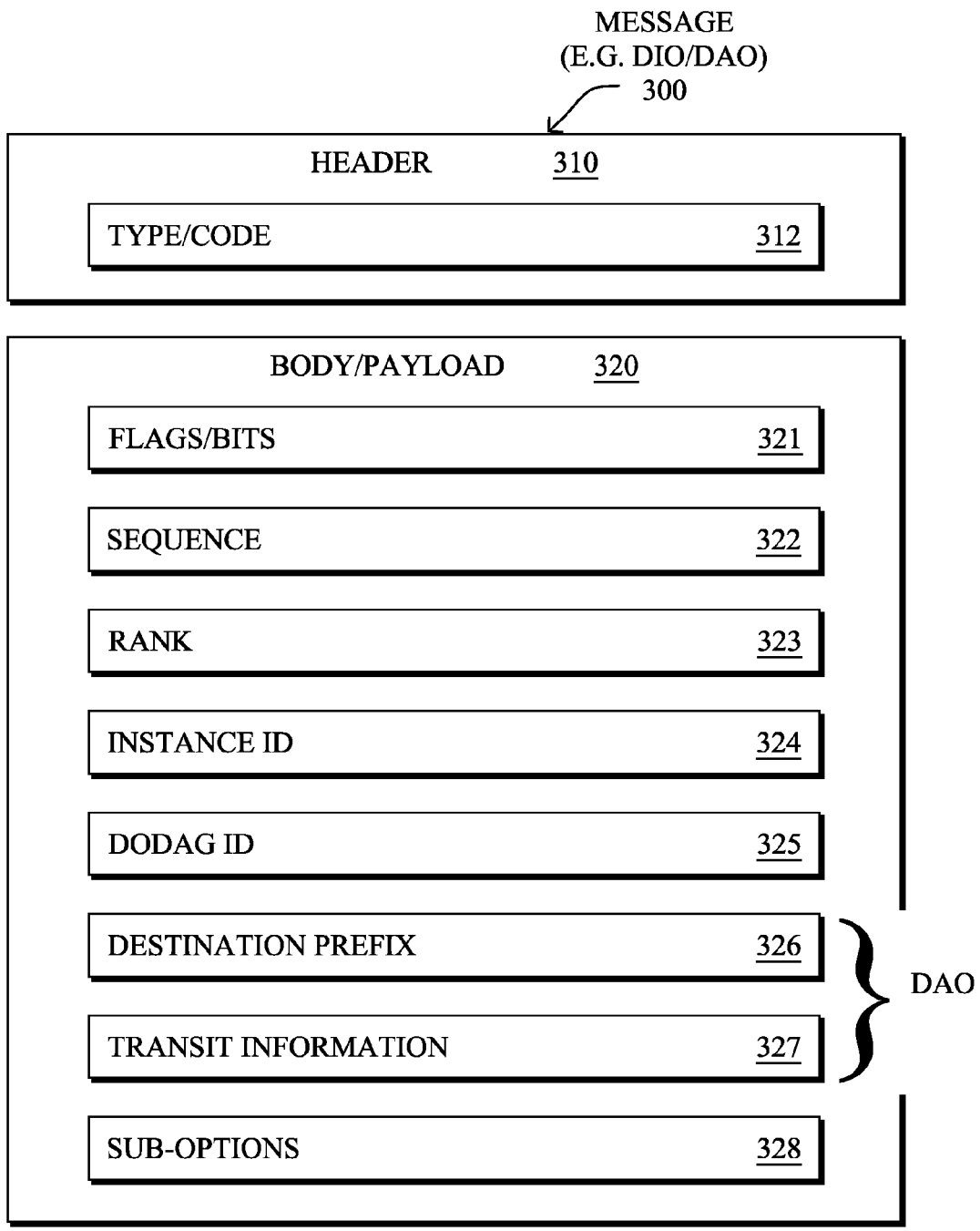
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/ bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, etc., as may be described herein, e.g., in one or more type-length-value (TLV) fields.

Figure 4:
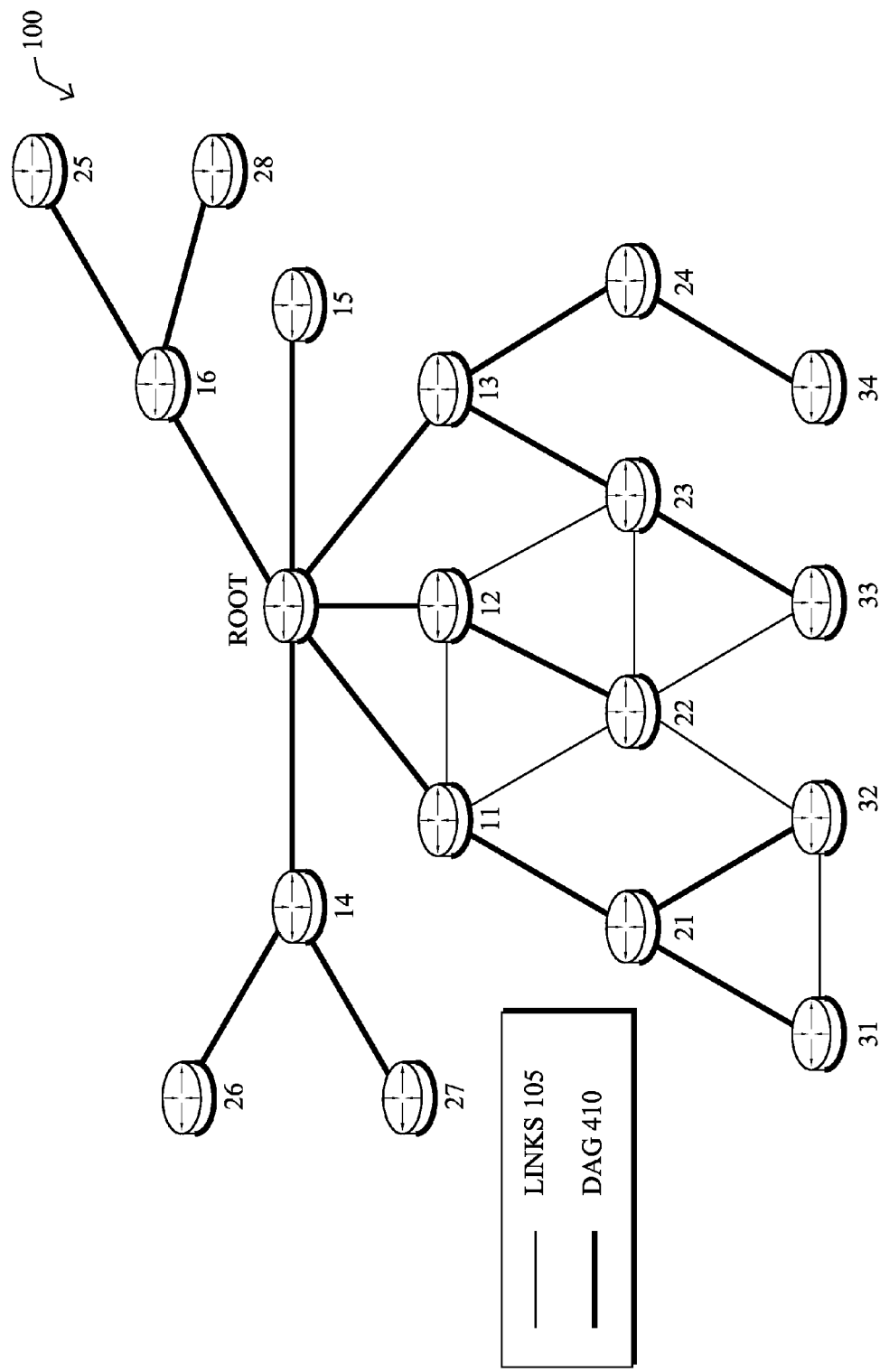
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, synchronized shared media networks transmit user traffic according to timeslots or even at fixed intervals, with an attempt to meet specific traffic requirements, optimize the overall efficiency of the system, etc. In contrast, non-synchronized systems are based on the assumption that nodes are free to transmit (after carrier sensing) when they have data to transmit without any synchronization. Although non-synchronous techniques are quite advantageous is many ways, this becomes very problematic as the offered load gets close to the maximum level of congestion that a link can tolerate before the link collapses.

Congestion may occur in a number of circumstances, for example, congestion may occur in response to a burst of critical messages after power failure in the grid, the failure of a node or a set of links causing a DAG topology change with a large number of new children joining a node, etc., or even simply in response generally to there being too much traffic in the network.

Figure 5:
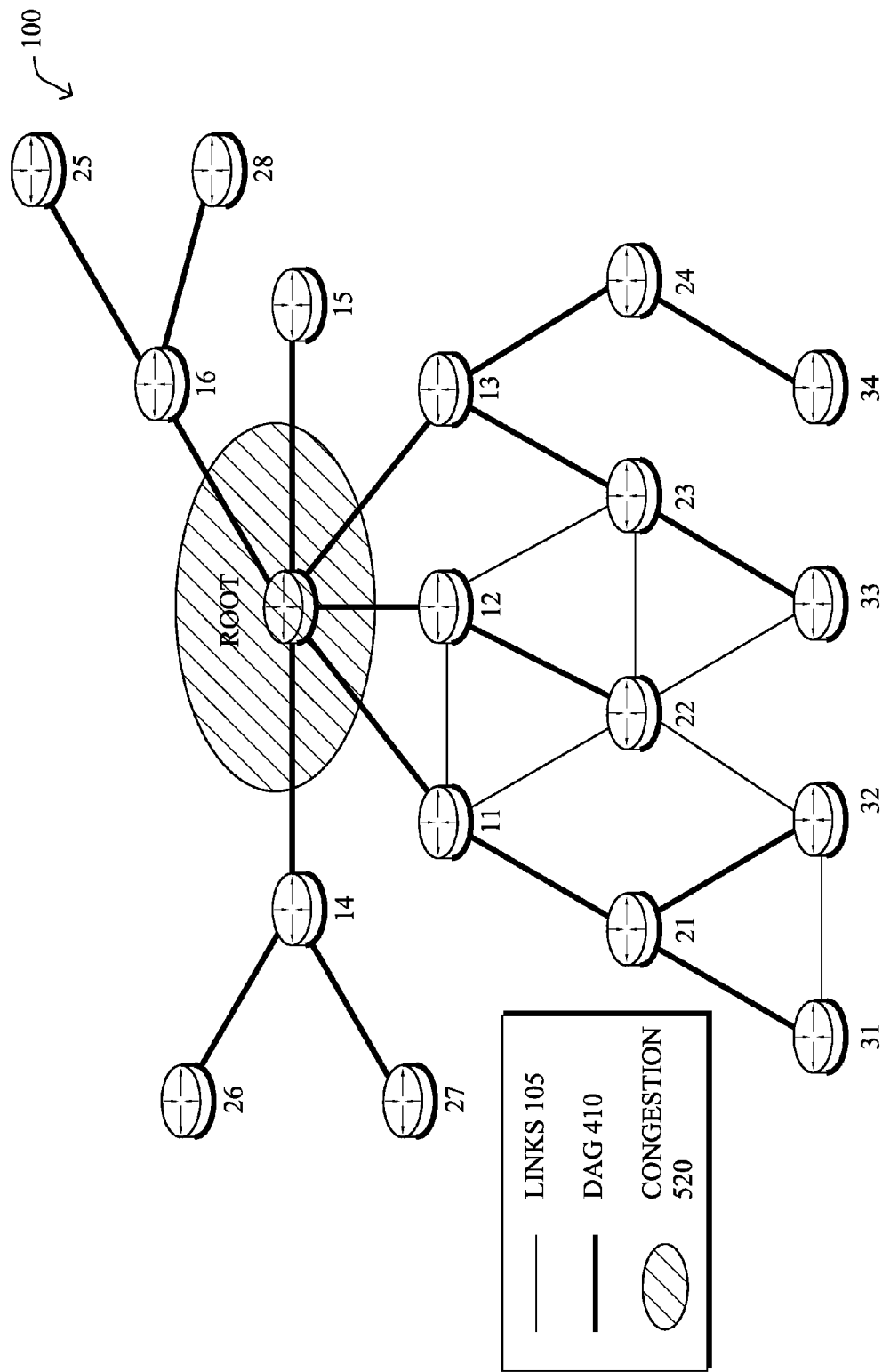
FIG. 5 illustrates an example of congestion in the network of FIG. 1.

FIG. 5 illustrates an example location of congestion (520) in the network of FIG. 1. For instance, due to the shape of the DAG 410, the root node may have child nodes consisting of nodes 11, 12, 13, 14, 15, and 16. Also, other nodes, though not transmitting directly to the root (e.g., node 26 transmitting to parent node 14), may still be located within listening range of the root node (albeit the link quality may be too poor for node 26 to select the root as its direct parent), and thus may interfere (e.g., collide, conflict, etc.) with the root node's reception of its own child nodes' traffic. (Notably, the use of the root node is merely an illustrative example, and any node within the network/DAG may utilize the techniques herein.) A node may monitor and track collisions, conflicts, and/or utilization characteristics, to illustrate a few of countless indicia of congestion that may be monitored and tracked. Some such indicia may suggest the likelihood of retransmissions, which exasperate the issue, and which may themselves be monitored and tracked. Threshold(s) relating to one or more monitored and tracked indicia may be accessed, and comparisons made between the indicia and threshold(s) to resolve the existence of congestion, and thus, inspire and inform assignment of.

Specifically, if each of these child nodes or neighbor nodes of the root node is attempting to transmit at the same time, the root node's links may become overloaded with traffic, and the root node may be unable to interpret the conflicting signals from its own child nodes. In this instance, once the congestion occurs, it may be exacerbated by the fact that the child nodes, experiencing lost traffic, begin to retransmit their traffic for additional attempts, further increasing the amount of traffic at this congested location 520.

Current approaches generally involve increasing the bandwidth on the links close to the congestion points (e.g., at/near DAG roots or other nodes), such as adding links, supporting multiple frequencies, etc., or performing load balancing on the traffic across a set of links across multiple (e.g., diverse) paths, limiting the number of children (of all orders) associated with the root node, among other techniques. These alternatives are directed at minimizing the risk of the congestion, however there is no solution to handle the congestion once it occurs.

Dynamic Synchronized Scheduling

The techniques herein introduce a receiving-node-driven distributed queuing system for data transmission across the transmitting nodes involved in the congestion of a non-synchronized network. In particular, the techniques may generally maintain the non-synchronized nature of the network as a whole, but synchronizes certain locations within the network at certain times, e.g., based on congestion fluctuations.

Specifically, according to one or more embodiments of the disclosure as described herein, a receiving node (e.g., the root node or any other node) in a computer network may detect congestion, and also identifies a set (e.g., subset) of its neighbor nodes. In response to the congestion, the receiving node may assign a transmission timeslot to each neighbor node of the set based on the congestion, where each neighbor is allowed to transmit (synchronously) only during its respective timeslot. The assigned timeslots may then be conveyed/transmitted to the set of neighbor nodes. In one or more additional embodiments, a transmitting node (e.g., a neighbor node of the receiving node) may is receive a scheduling packet from the receiving node. Accordingly, the transmitting node may determine its assigned transmission timeslot during which the transmitting node is allowed to transmit. As such, the transmitting node may then transmit packets only during the assigned timeslot. In this manner, congestion at the receiving node may be reduced.

Illustratively, the techniques described herein may be performed by hardware, software, and/or firmware, such as in accordance with topology management process 248, which may contain computer executable instructions executed by the processor 220 to perform functions relating to the novel techniques described herein. For example, the techniques herein may be treated as extensions to conventional protocols, such as the RPL protocol, and as such, would be processed by similar components understood in the art that execute the RPL protocol, accordingly.

Note that because of a "hidden terminal" problem, the only node that can actually determine the actual level of congestion of the shared media is the receiving node (e.g., the DAG root in FIG. 5). Indeed, in this particular example, nodes 14 and 15 may not "see" each other; since these nodes are hidden neighbors, and the root node can "see" all traffic destined to it (in contrast with the other nodes that may not see each other). Again, it should be noted that the root is one example location in the network where congestion is likely to take place, though others certainly can exist, and the root node is just one example receiving node. Additionally, it should be noted that the location of the congestion in the DAG may change depending on particular communication patterns and various events that specific nodes may need to either notify or be notified about. Accordingly, an example first step is to send a neighbor discovery message (e.g., a message/packet 140) to determine the list S of all of its neighbors (e.g. 11, 12, 13, 14, 15, and 16 in the example). (Alternatively, as described below, identifying this set of neighbors may be performed in response to detecting congestion.) In accordance with another example embodiment, the list of neighbors can be obtained from the stored topology 249.

Operationally, a receiver node (e.g., the root node) determines when a link (e.g., a is shared media) is close to a critical level of congestion (called X). As mentioned above, when the link utilization approaches X, the percentage of utilization of the links greatly degrades (e.g., collapses). In certain embodiments, the link utilization measurement may be performed without the use of any low pass filter to be able to react sufficiently quickly upon network congestion. Alternatively, in certain embodiments, the measurement may use a low pass filter with a reduced "smoothing" effect. For example, a reduced smoothing effect may be represented as: New_X=0.2*Old_X+0.8*Instantaneous_X. If X (new X) approaches a congestion point, then the receiving node may detect the congestion, accordingly.

Upon detecting congestion (520), the receiving node may first determine the set of neighbor nodes, e.g., sending nodes S'. Illustratively, two situations may occur:

Case 1: the level of collision is so high that the receiving node cannot properly receive enough packets to determine the addresses of the senders in S'. In this case, the root computes S'=S (i.e., all of the neighbors of the receiving node).

Case 2: the receiving node can still receive enough packets to determine the list S' of active senders. In this case, a subset of all neighbor nodes of the receiving node may be determined, such as based on determining and selecting those neighbor nodes that are most contributing to the congestion.

According to one or more embodiments here, the receiving node may maintain the list S' before any congestion is detected so as to have S' already computed should a congestion take place. Different algorithms may be used to determine this list, such as, for example, maintaining the list of senders that sent at least N packets during the last M seconds, recording the priority of their traffic, etc.

The receiving node may then act as a remote distributed scheduler and assigns a transmission timeslot to the neighbor nodes attempting to send packets. That is, each neighbor is allowed to transmit, synchronously with other neighbor nodes of the set S', only during its respective timeslot. FIGS. 6A-E illustrate example scheduling sequence 600 that may be assigned by the receiving node, e.g., the root node in the example herein.

Figure 6A:
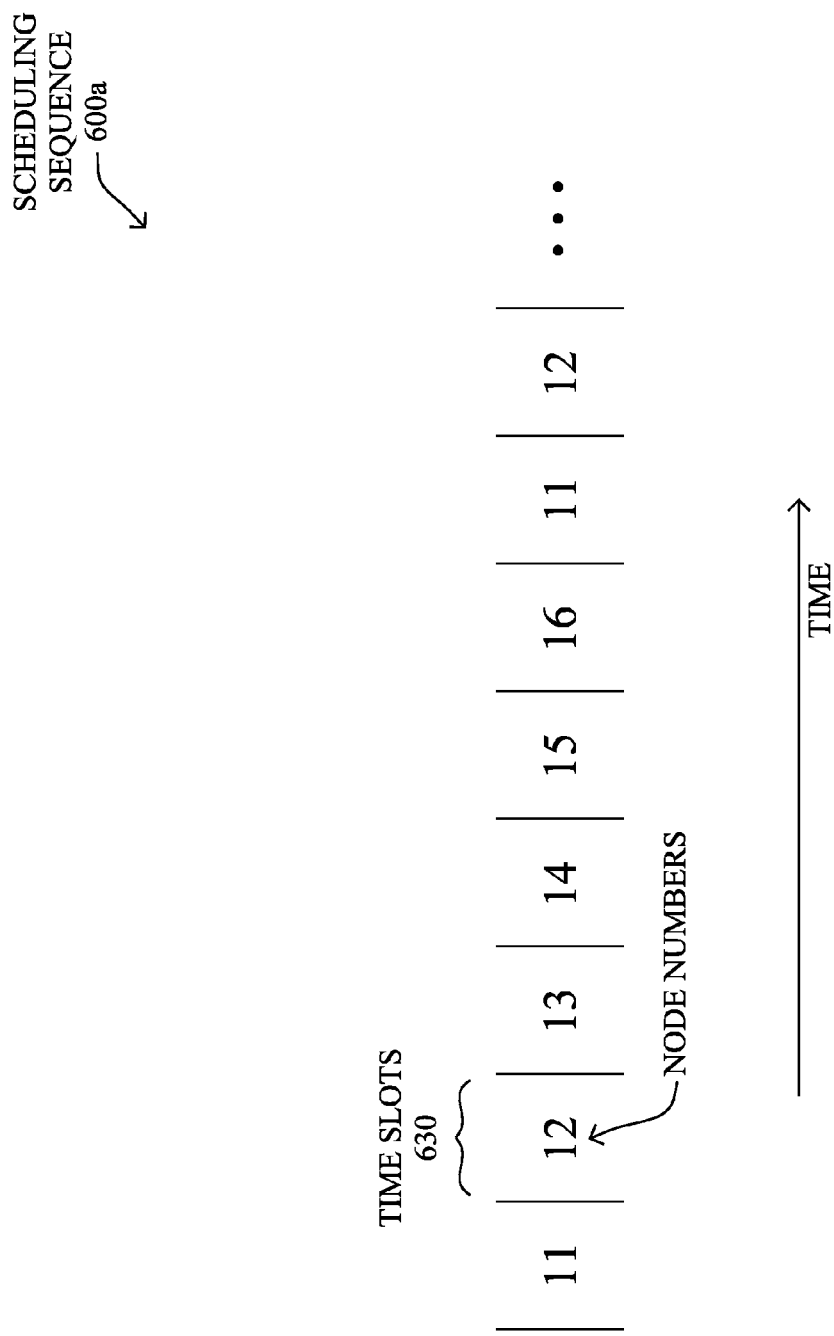
FIGS. 6A-E illustrates example synchronized scheduling timeslots.

For instance, FIG. 6A illustrates that the scheduling sequence 600*a* may be a round-robin assignment, such as providing timeslots 630 for each node within a period, such as "|11|12|13|14|15|16| . . . ". Note that the actual order of the timeslots 630 is not meant to be limiting, and any order may be used, particularly since the timeslots are reserved periods of exclusivity for each transmitting neighbor node and there is no overlap. That is, each node in the set S' receives one (or more) timeslot(s) within a particular period, and the actual location with respect to other timeslots is essentially inconsequential.

Figure 6B:
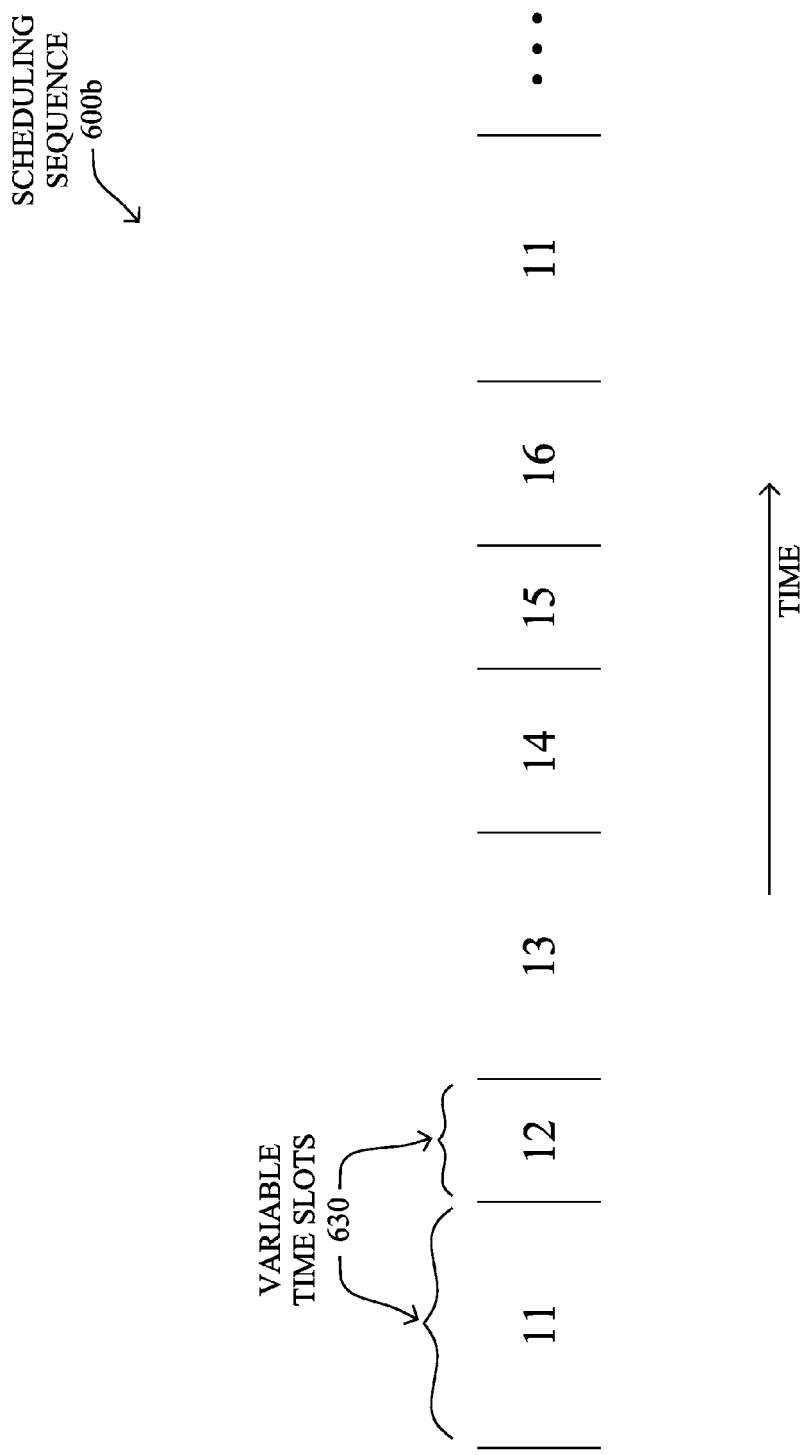

Alternatively, FIG. 6B illustrates a sequence 600*b* that includes variable length timeslots for each neighbor node of the set. For instance, assuming that the receiving node determined that nodes 11 and 13 carry the most traffic, or the highest priority traffic, etc., and nodes 12 and 15 carry the least traffic or lowest priority traffic, then nodes 11 and 13 may be given longer timeslots 630, and nodes 12 and 15 may be given shorter timeslots. For example, this information may have been determined based on receiving non-corrupted packets from the senders during the congestion or else having the information already available in the event that S' had been computed prior to any congestion in the network. Note that this information may also have been determined a priori according to pre-configured local policy.

Figure 6C:
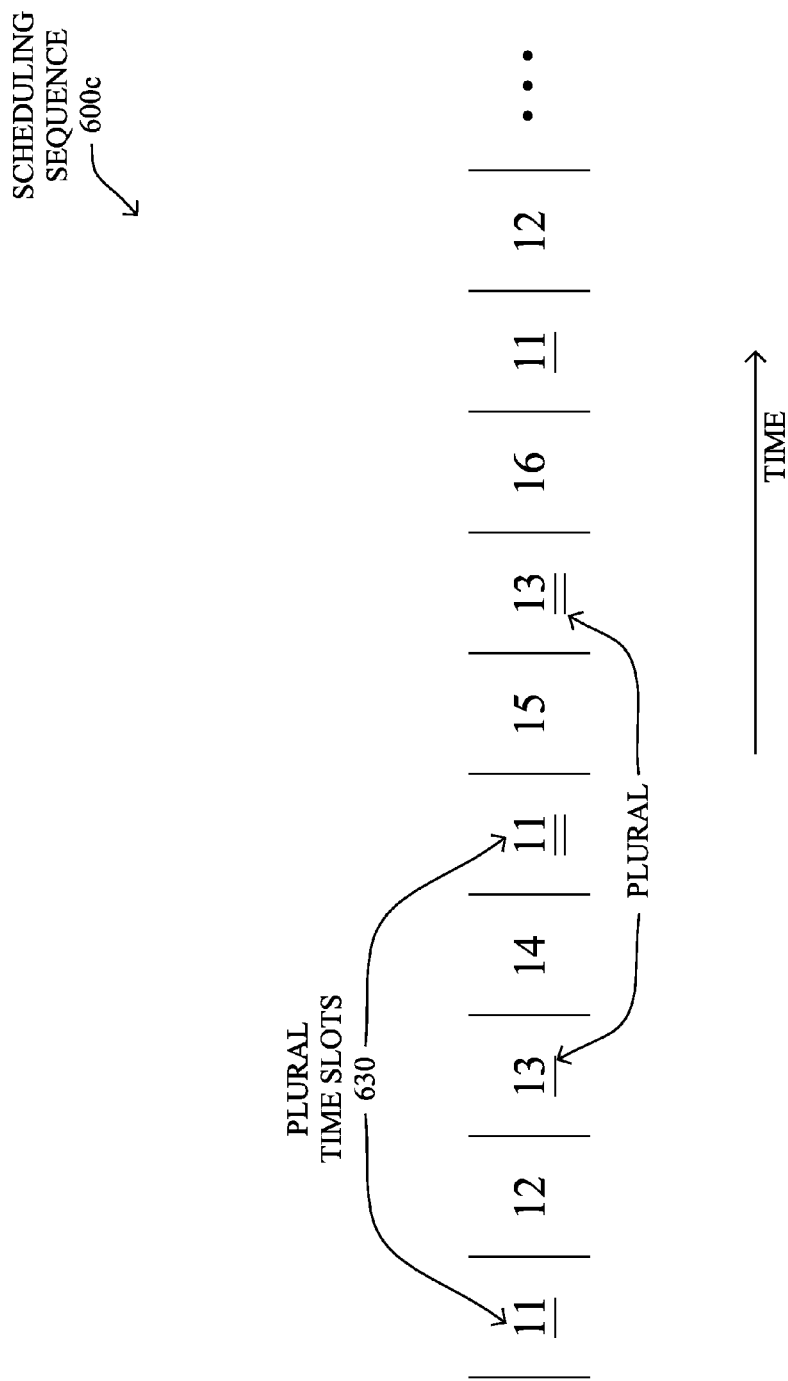

Additionally, in another alternative embodiment as shown in FIG. 6C, a different number of timeslots 630 may be assigned to a particular neighbor within a sequence 600*c* of timeslots. For example, assuming still that nodes 11 and 13 are determined to have more contribution to the congestion or higher priority traffic, then nodes 11 and 13 may receive plural timeslots within a period of the sequence. For instance, as shown, the sequence 600*c* comprises: "|11|12|13|14|11|15|13|16| . . . "

Figure 6D:
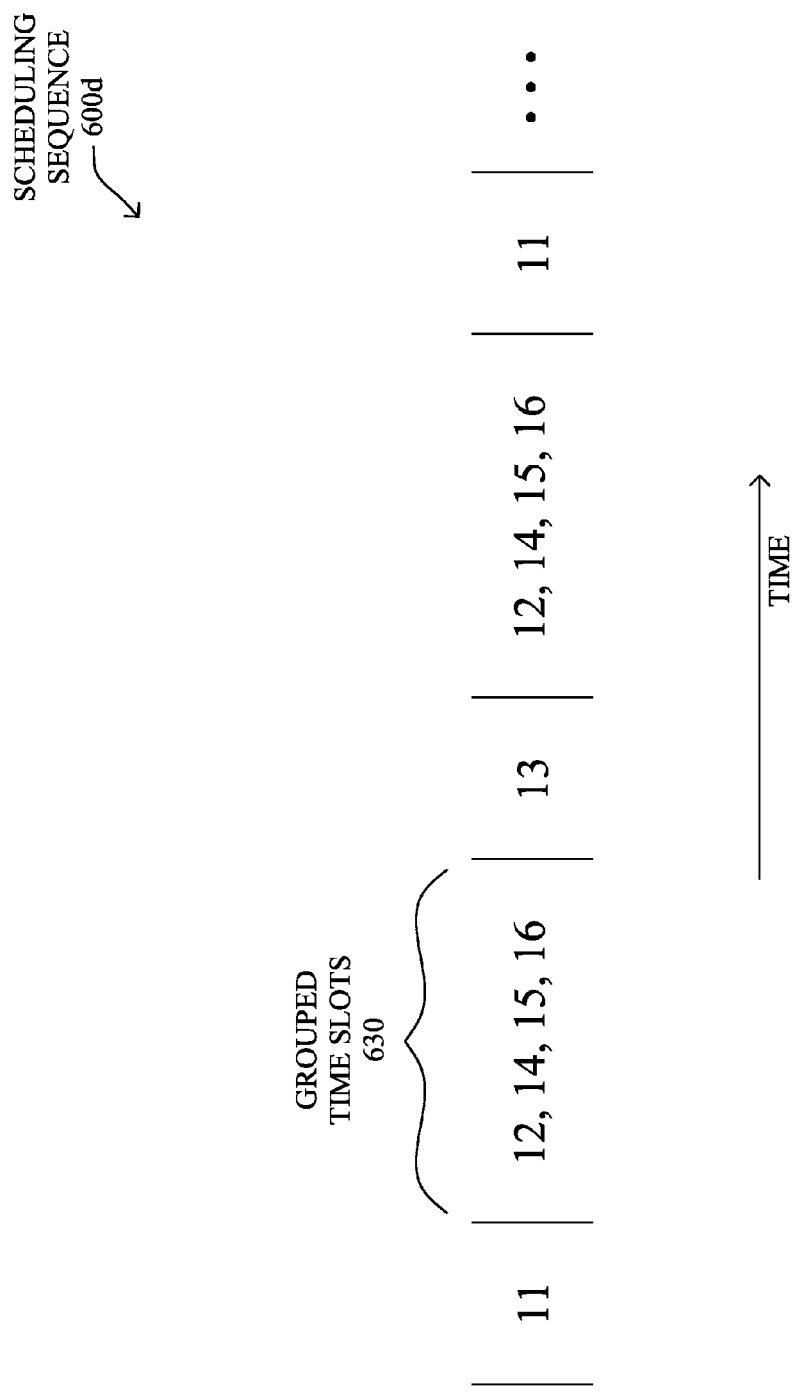

Further, as shown in FIG. 6D, certain timeslots may be shared by a group of nodes within the set S'. In particular, sequence 600*d* illustrates that nodes 12, 14, 15, and 16 may be grouped into a shared timeslot 630, while nodes 11 and 13 are given their own timeslots. In this manner, assuming nodes 11 and 13 generate the majority of the traffic that causes the congestion, nodes 11 and 13 are given their own dedicated timeslots to is transmit their traffic, while the other nodes, which presumably do not contribute as much to the congestion 520, each share the remaining timeslots.

Figure 6E:
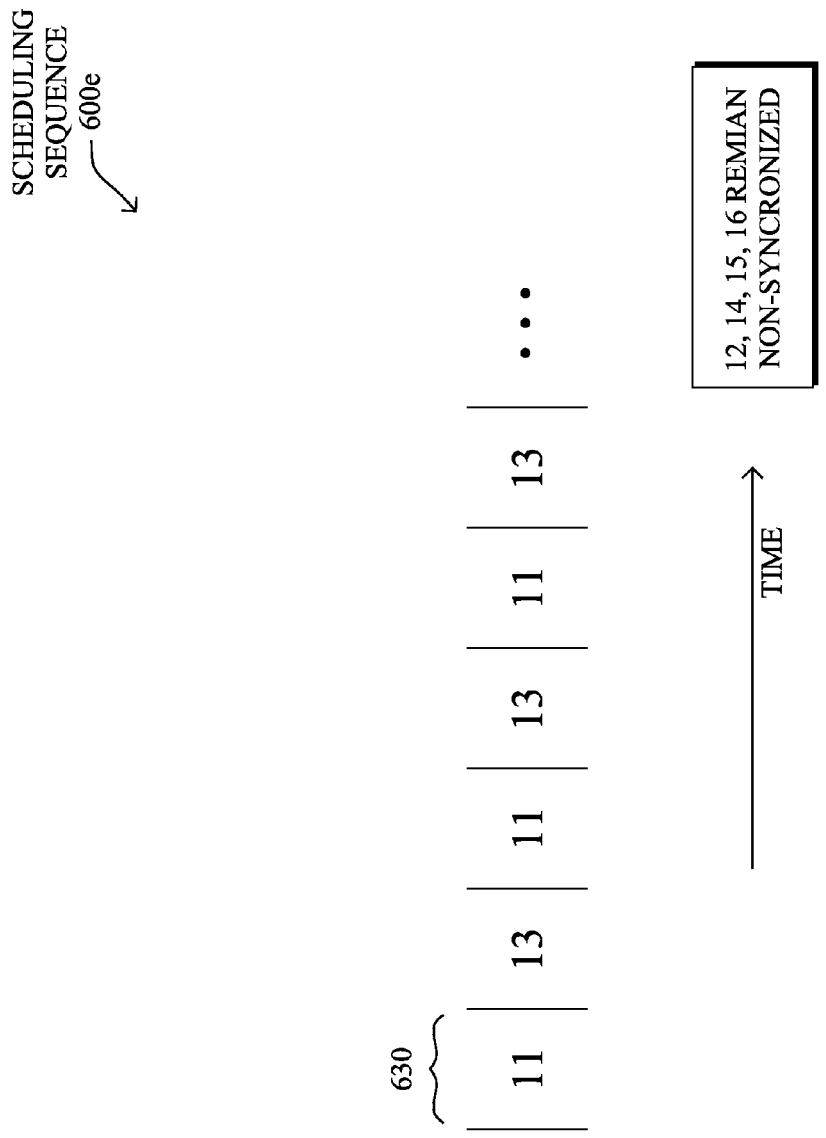

Still further, FIG. 6E illustrates the option to include only certain nodes within the subset S' of neighbor transmitting nodes S. Specifically, while FIGS. 6A-D illustrate including all of the neighbors of the root node in the sequence, other embodiments may merely include those top contributors to the congestion in the sequence 600*e*. For example, as shown, assuming that nodes 11 and 13 compete with one another for transmission space, nodes 11 and 13 may be given alternating timeslots 630 to ensure that their traffic does not conflict at the root node, while the other nodes (12, 14, 15, and 16) remain non-synchronized, and can transmit whenever desired (e.g., assuming they are not heavy contributors to the congestion 520).

Note further that while each embodiment in FIGS. 6A-E above illustrate assigning each timeslot 630 to a node or set of nodes, it is possible in certain embodiments to leave certain timeslots of a sequence 600 unassigned ("empty"). For instance, where not all neighbor nodes are included in subset S', the unassigned slots may be used by nodes not included in the subset. For example, if in FIG. 6D nodes 12, 14, 15, and 16 were not specifically assigned to the intermediate timeslots between nodes 11 and 13, then nodes 12, 14, 15, and 16 could transmit during any timeslot, including those in which nodes 11 and 13 were transmitting (e.g., they remain non-synchronous, but do not contend with nodes 11 and 13 during certain timeslots). Alternatively, in another example embodiment, nodes 12, 14, 15, and 16 are restricted to their assigned timeslot, however they can still transmit urgent messages at any time including the timeslots assigned to nodes 11 and 13. Also, in the event that all neighbor nodes are assigned a timeslot, there may still be unassigned timeslots inserted into the sequence 600, such as to account for unknown nodes (e.g., during discovery phases), or else to allow for clearing of a receive queue, or other reasons. For example, FIG. 6A's sequence 600*a* may be adjusted to be "|11|12|13|14|15|16|unassigned| . . . ".

Also, in one or more particular embodiments, too, that if a node is assigned a timeslot that does not need the allocated timeslot, it may return it back to the assigning is node (the timeslot allocation process) to allow it to be assigned to another node, accordingly. In other words, a node may determine that it does not need its assigned timeslot, and notifies the assigning node, such that the particular timeslot is allowed to be assigned to other neighbor nodes of the assigning node.

Once the sequence 600 is established, the assigned timeslots are transmitted by the receiving node to the set of neighbor nodes. For instance, an array may be built that contains the node address (could be a link layer or IP address) along with a specific time slot and duration for each node in the set S'. Note that if then all nodes in the receiving nodes' vicinity are listed in the array. This array may then be sent using a "scheduling packet" 140 (e.g., any packet format configured to carry the information, as may be understood by those skilled in the art). In one embodiment, for example, the receiving nodes send the scheduling packet using a link-local multicast packet that may be received by all nodes within the receiving node's vicinity.

According to certain embodiments, the receiving node may also set a length of time for which the assigned timeslots are to be used, and may start a configurable timer T. Moreover, in specific embodiments, the receiving node may include this timer T within the notification (scheduling packet) sent to the neighbor nodes.

Upon receiving the scheduling packet, the transmitting nodes (neighbors in set S') stop sending packets in a non-synchronized fashion. Specifically, these nodes start buffering packets, and schedule packet transmission according to the received schedule. For instance, the transmitting nodes may determine their assigned transmission timeslot 630 based on the received sequence 600 in the scheduling packet, and the transmitting node can thus determine when it is allowed to transmit synchronously with other neighbor nodes of the receiving node. As such, while the synchronized scheduling is enforced, the transmitting nodes (e.g., nodes 11-16) transmit their packets/traffic only during their assigned timeslot, as described above with reference to FIGS. 6A-E.

Once the timer T expires, or in response to determining that the congestion 520 has been relieved, the receiving node (e.g., root node) may send a "schedule clearing" packet to instruct the neighbor nodes to no longer use the assigned timeslots (e.g., again using a link local multicast address), and all transmitting nodes may then be allowed to return to their non-synchronized mode of operation. Alternatively, the transmitting nodes themselves may, in certain embodiments noted above, be configured to determine the length of time for which the assigned timeslots are to be used, and may begin transmitting non-synchronized packets in response to expiration of the length of time.

If another congestion takes place before the expiration of a second timer, the process may be restarted with a longer timer, e.g., T=2*T, and the scheduling process is adjusted accordingly. Increasing this length of time for subsequent detected congestion may help alleviate greater congestion, however in certain circumstances it may be necessary (or otherwise merely desired) to adjust the actual scheduling sequence 600 to account for the continued congestion (e.g., longer timeslots 630, different arrangements of timeslot assignments, including more neighbors in the sequence, etc.). Adjusting the time T and the sequence 600 may occur individually at each iteration, or may be adjusted simultaneously. Note that while adjusting the time/schedule in this manner for continued congestion, once the system returns to its normal mode of operation (no scheduling), if after a period of time, e.g., equal to 2*current_T, no congestion occurs, the timer T may be reset to its minimum (e.g., original) value should another congestion take place later on.

Note that while the embodiments above are based on distributing the scheduling sequence 600 in response to congestion, one or more alternative embodiments herein may allow the "detection" of congestion to be based on expecting congestion at the receiving node. Accordingly, timeslots may be assigned and transmitted to the neighbors in response to the expected congestion. In other words, certain nodes may receive their timeslots and instructions to operate synchronously a priori (e.g., nodes 11 and 13 being given the sequence 600e of FIG. 6E in advance), while the remaining nodes (12, 14, 15, and 16) can operate non-synchronously (still using the non allocated/unassigned slots), e.g., until a later time if congestion still occurs when the receiving (e.g., root) node may then expand the set of nodes to synchronize. As such, certain embodiments herein may apply scheduling to certain nodes a priori, while other nodes can be scheduled in response congestion, thus allowing certain portions of the network (e.g., closer to the root) to operate in a synchronized manner, while the remaining areas of the network maintain their non-synchronized mode of operation.

Moreover, while the embodiments above suggest that at least a portion of the network remains non-synchronized throughout operation, it is possible that the entire network 100 is synchronized according to the dynamic scheduling described herein. For instance, in certain embodiments, each receiving node in the entire network may be experiencing congestion, and each may then schedule its neighbors' transmissions accordingly. At the same time, however, this detected congestion may be expected congestion, and the a priori scheduling at each of these nodes may result in an entirely synchronized network. In this instance, the techniques herein differ from convention synchronized networks in that the timeslots may be dynamically adjusted in response to continued congestion, and in that the scheduling may be removed in response to determining that the congestion (e.g., the expected congestion) does not exist in the first place. (E.g., in this case, starting with a synchronized network, and then possibly reducing strict scheduling guidelines or allowing increasing periods of non-synchronized or partially-synchronized operation to determine how the network would handle non/partial-synchronized behavior: that is, "testing the water".)

Also, while it is assumed that all neighbor transmitting nodes will comply with the request, it is possible to have one or more nodes not complying with the scheduling sequence (e.g., unwilling or unable to comply), e.g., node 15. In this instance, it may be beneficial to remove or ignore the incoming traffic from this node (node 15). In this example, in the absence of an ACK, the sending child ignoring the scheduling request may be tempted to use an alternate parent hopefully not colliding with the packets in the congested area. Alternatively, it may be useful to rearrange the schedule 600 to include the unassigned timeslots 630 noted above to account for node 15's traffic (though not solving contention problems during the actual assigned timeslots for other nodes, but giving node 15 a chance to communicate).

Figure 7:
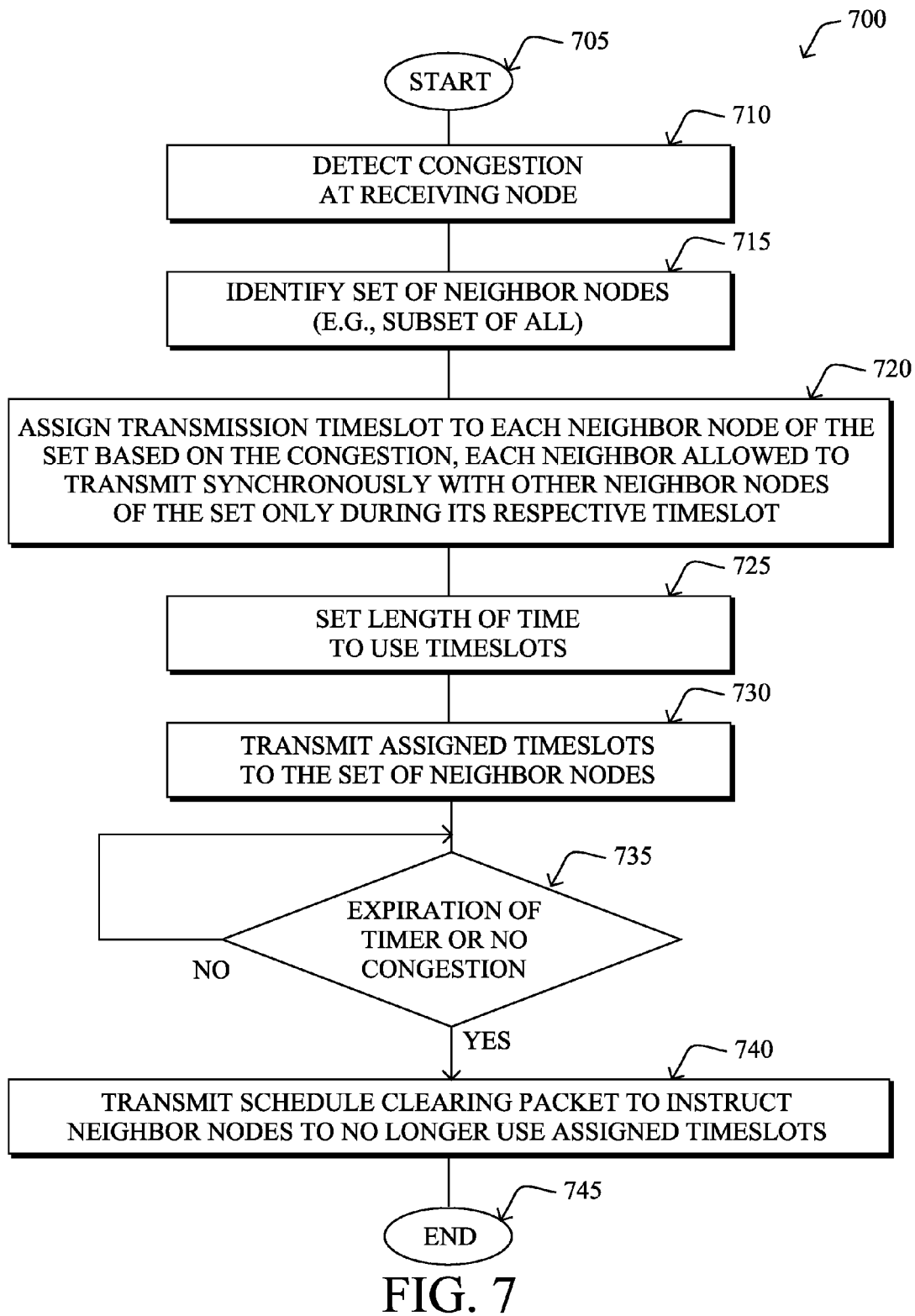
FIG. 7 illustrates an example simplified procedure for dynamically establishing synchronization timeslots from the perspective of a receiving node.

In closing, FIG. 7 illustrates an example simplified procedure for dynamically establishing synchronization timeslots in accordance with one or more embodiments described herein, e.g., from the perspective of a receiving node (e.g., the root node). The procedure 700 starts at step 705, and continues to step 710, where the receiving node detects incoming congestion (e.g., on one or more of its links/interfaces) as described above. In response, (or, alternatively, in advance), in step 715 the receiving node may identify a set of neighbor nodes to be assigned (e.g., "receive") a timeslot, which may consist of all neighbors of the receiving node, all neighbors transmitting to the receiving node, only those neighbors contributing (e.g., significantly) to the congestion, or other subset of all the neighbors, as mentioned above.

In step 720, the receiving node assigns transmission timeslots 630 to each neighbor node (or subset) of the set based on the congestion, where, as described herein, each neighbor is allowed to transmit synchronously with other neighbor nodes of the set only during its respective timeslot. After optionally setting a length of time to use the timeslots in step 725, the receiving node transmits the assigned timeslots to the set of neighbor nodes in step 730, where the neighbor nodes begin transmitting in scheduled synchronization, accordingly.

Upon expiration of the set time in step 735 (e.g., where the transmitting/neighbor nodes are not otherwise aware of the set time), or else in response to an indication that there is no longer any congestion, the receiving node may transmit a schedule clearing packet in step 740 to instruct the neighbor nodes to no longer use the assigned timeslots. The procedure 700 may then end in step 745, that is, with the ability to restart in steps 705/710 in response to further congestion, e.g., increasing the set time in step 725 and/or changing the assignment of timeslots in step 720, accordingly.

Figure 8:
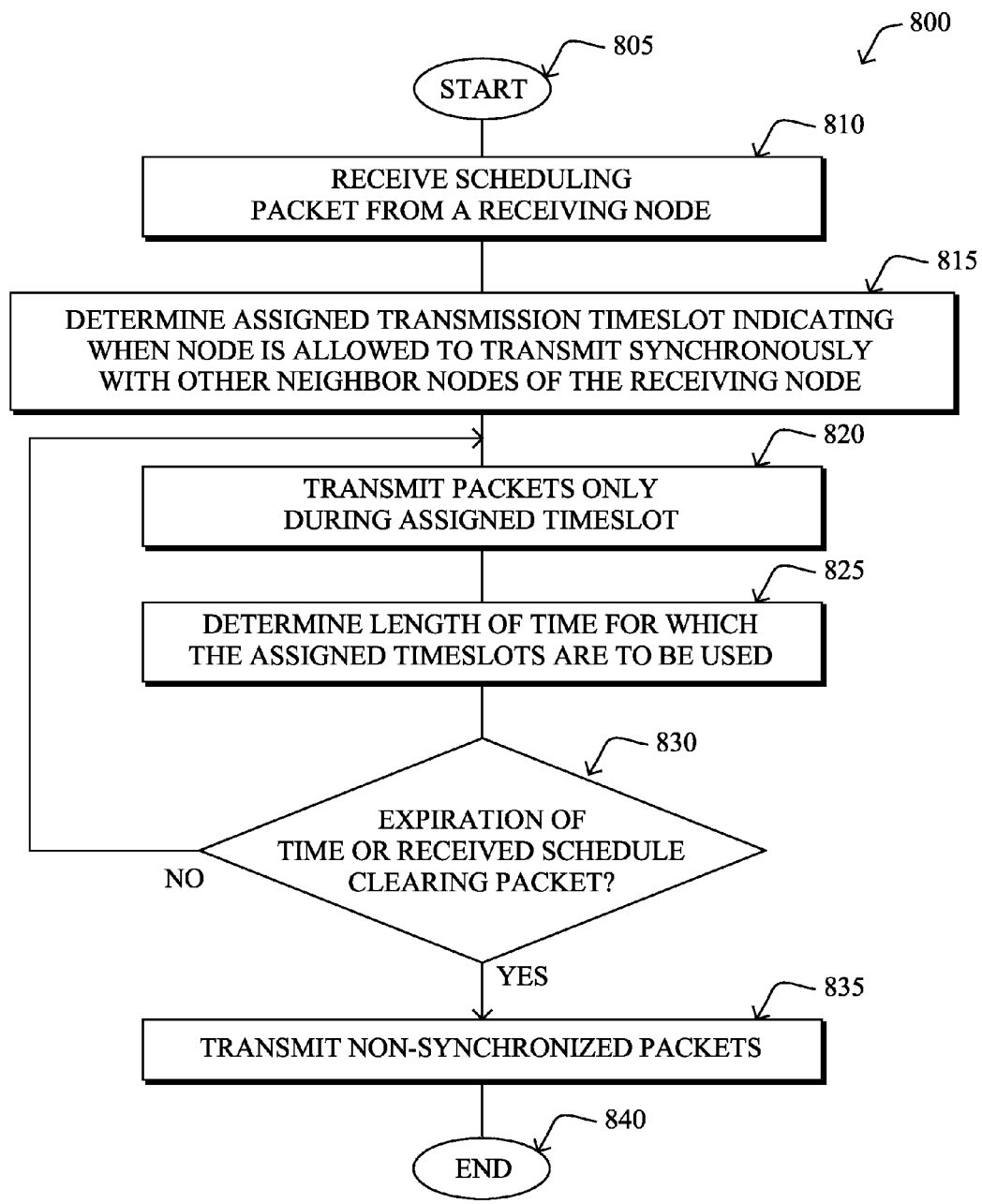
FIG. 8 illustrates an example simplified procedure for dynamically establishing synchronization timeslots from the perspective of a transmitting node.

Additionally, FIG. 8 illustrates an example simplified procedure for dynamically establishing synchronization timeslots in accordance with one or more embodiments described herein, e.g., from the perspective of a transmitting node (e.g., node 11). The procedure 800 starts at step 805, and continues to step 810, where the transmitting node receives a scheduling packet (e.g., packet 140) from a receiving node (e.g., the root node). From this received notification, in step 815 the transmitting node may determine its assigned transmission timeslot 630 indicating when the node is allowed to transmit synchronously with other neighbor nodes of the receiving node (e.g., nodes 12, 13, 14, 15, and 16).

In step 820, whenever a packet is to be transmitted from the node, it may be transmitted only during the correspondingly assigned timeslot(s), as described above. Based on determining the length of time for which the assigned timeslots are to be used in step 825, and/or based on expiration of that time or an explicit received schedule clearing packet in step 830, then in step 835 the transmitting node may return to transmitting non-synchronized packets. The procedure 800 ends in step 840, where additional scheduling requests may be received in future instances of the procedure, starting again at steps 805/810, accordingly.

The novel techniques described herein, therefore, dynamically establish synchronization timeslots in a computer network. In particular, the embodiments herein allow a non-synchronized network to activate a distributed scheduling algorithm so as to avoid collapse of a congested shared-media, upon determining that the link utilization is approaching an unacceptable limit. Specifically, the receiving nodes experiencing the congestion determine a sequence of timeslots that is distributed to the transmitting node for a dynamic period of time, thus clearing the congestion. After the expiration of a dynamic timer, the transmitting nodes may switch back to their non-synchronized mode of operation. Accordingly, the techniques herein greatly enhance the efficiency of shared media networks, thus avoiding a link collapse thanks to distributed scheduling.

While there have been shown and described illustrative embodiments that dynamically establish synchronization timeslots in a computer network, it is to be understood that various other adaptations and modifications may be made within the spirit and scope of the embodiments herein. For example, the embodiments have been shown and described herein with relation to LLNs and DAGs, and more particular, to the RPL protocol. However, the embodiments in their broader sense are not as limited, and may, in fact, be used with other types of networks and/or protocols susceptible to congestion. Also, while the techniques described above generally reference wireless communication or other shared media (e.g., PLC), the techniques herein may be used for other types of media, including wired media (e.g., node-based congestion requesting that neighbors help the node reduce its processing queue).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting indicia of congestion at a receiving node in a computer network;
    identifying a set of neighbor nodes to the receiving node;
    assigning at least one scheduled transmission timeslot to each neighbor node of the set, with the transmission timeslot of at least one neighbor node being assigned based on the detected indicia of congestion, each neighbor node being allowed to transmit synchronously with other neighbor nodes of the set only during each neighbor node's respective timeslot;
    transmitting the assigned timeslots to the set of neighbor nodes;
    setting a length of time for which the assigned timeslots are to be used;
    in response to expiration of the length of time, transmitting a schedule clearing packet to instruct the neighbor nodes to no longer use the assigned timeslots;
    receiving notification from a particular neighbor node that the particular neighbor node does not need its particular assigned timeslot; and
    in response to receiving the notification from the particular neighbor node, allowing the particular assigned timeslot to be assigned to other neighbor nodes of the set.

2. The method as in claim 1, wherein identifying the set comprises:
    determining a subset of all neighbor nodes of the receiving node.

3. The method as in claim 2, wherein determining comprises:
    determining a congestion contribution by each neighbor node; and
    selecting the subset based on the congestion contribution of each neighbor node.

4. The method as in claim 1, wherein identifying the set is performed in response to detecting the indicia of congestion.

5. The method as in claim 1, wherein assigning the timeslots comprises:

assigning the timeslots as a round-robin assignment to the set of neighbor nodes.

6. The method as in claim 1, wherein assigning the timeslots comprises:
assigning variable timeslots to each neighbor of the set of neighbor nodes based on the detected indicia of congestion.

7. The method as in claim 1, wherein assigning the timeslots comprises:
assigning a different number of timeslots within a sequence of timeslots to one or more particular neighbors of the set of neighbor nodes based on the detected indicia of congestion.

8. The method as in claim 1, wherein transmitting comprises:
utilizing a link local multicast packet.

9. The method as in claim 1, further comprising:
increasing the length of time for subsequently detected indicia of congestion.

10. The method as in claim 1, wherein detecting comprises:
expecting indicia of congestion at the receiving node; and
assigning timeslots and transmitting the timeslots to the neighbor nodes in response to the expected indicia of congestion.

11. The method as in claim 1, further comprising:
measuring an indicia of congestion relating to a particular one of the transmitting nodes;
accessing a threshold relating to the indicia of congestion;
comparing the accessed threshold to the measured indicia of congestion relating to the particular one of the transmitting nodes;
responsive to a determination that the accessed threshold is met by the measured indicia of congestion relating to the particular one of the transmitting nodes, assigning a disproportionate aggregate transmission timeslot to the particular one of the transmitting nodes relative to other of the transmitting nodes.

12. An apparatus, comprising:
one or more network interfaces to communicate in a computer network;
a processor coupled to the network interfaces and adapted to execute one or more processes; and
a memory configured to store a process executable by the processor, the process when executed operable to:
detect indicia of congestion at a receiving node in a computer network;
identify a set of neighbor nodes to the receiving node;
assign at least one scheduled transmission timeslot to each neighbor node of the set, with the transmission timeslot of at least one neighbor node being assigned based on the detected indicia of congestion, each neighbor node being allowed to transmit synchronously with other neighbor nodes of the set only during each neighbor node's respective timeslot;
transmit the assigned timeslots to the set of neighbor nodes;
set a length of time for which the assigned timeslots are to be used;
in response to expiration of the length of time, transmit a schedule clearing packet to instruct the neighbor nodes to no longer use the assigned timeslots;
receive notification from a particular neighbor node that the particular neighbor node does not need its particular assigned timeslot; and
in response to receiving the notification from the particular neighbor node, allow the particular assigned timeslot to be assigned to other neighbor nodes of the set.

13. The apparatus as in claim 12, wherein the process when executed to identify the set is operable to:
determine a subset of all neighbor nodes of the apparatus.

14. The apparatus as in claim 12, wherein the process when executed to assign the timeslots is operable to perform at least one of the following:
assign the timeslots as a round-robin assignment to the set of neighbor nodes;
assign variable timeslots to each neighbor of the set of neighbor nodes based on the detected indicia of congestion; and
assign a different number of timeslots within a sequence of timeslots to one or more particular neighbors of the set of neighbor nodes based on the detected indicia of congestion.

15. A method, comprising:
receiving, at a transmitting node, a scheduling packet from a receiving node to which packets are transmitted from the transmitting node;
determining a scheduled transmission timeslot assigned to the transmitting node based on a detected indicia of congestion, the transmitting node being allowed to transmit synchronously with other neighbor nodes of the receiving node only during transmitting node's respective timeslot;
in response, transmitting packets from the transmitting node only during the assigned transmission timeslot;
determining a length of time for which the assigned transmission timeslot is to be used;
in response to expiration of the length of time, transmitting non-synchronized packets from the transmitting node;
determining that the transmitting node does not need the assigned transmission timeslot; and
in response to determining that the transmitting node does not need the assigned transmission timeslot, notifying the receiving node that a particular timeslot is allowed to be assigned to other neighbor nodes of the receiving node.

16. The method as in claim 15, further comprising:
receiving a schedule clearing packet to instruct the transmitting node to no longer use the assigned transmission timeslot; and, in response,
transmitting non-synchronized packets from the transmitting node.

17. An apparatus, comprising:
one or more network interfaces to communicate in a computer network;
a processor coupled to the network interfaces and adapted to execute one or more processes; and
a memory configured to store a process executable by the processor, the process when executed operable to:
receive a scheduling packet from a receiving node to which packets are transmitted from the apparatus;
determine a scheduled transmission timeslot assigned to the apparatus based on a detected indicia of congestion, the apparatus being allowed to transmit synchronously with other neighbor nodes of the receiving node only during the apparatus's respective timeslot;
transmit packets only during the assigned transmission timeslot;
determine a length of time for which the assigned transmission timeslot is to be used;
transmit non-synchronized packets in response to expiration of the length of time;
receive a schedule clearing packet to instruct the apparatus to no longer use the assigned transmission timeslot; and
transmit non-synchronized packets in response to receiving the schedule clearing packet.

\* \* \* \* \*